United States Patent
Blanchette et al.

(10) Patent No.: US 11,747,050 B2
(45) Date of Patent: Sep. 5, 2023

(54) SEALED PACKAGE FOR SOLID REACTANT IN SELF-HEATING ASSEMBLY

(71) Applicant: Tempra Technology, Inc., Bradenton, FL (US)

(72) Inventors: Corey R. Blanchette, Sarasota, FL (US); Cullen M. Sabin, Bradenton, FL (US); Alan James Maskell, Grittleton (GB)

(73) Assignee: Tempra Technology, Inc., Bradenton, FL (US)

( * ) Notice: Subject to any disclaimer, the term of this patent is extended or adjusted under 35 U.S.C. 154(b) by 248 days.

(21) Appl. No.: 17/082,710

(22) Filed: Oct. 28, 2020

(65) Prior Publication Data

US 2021/0131705 A1 May 6, 2021

Related U.S. Application Data

(60) Provisional application No. 62/927,930, filed on Oct. 30, 2019.

(51) Int. Cl.
*F24V 30/00* (2018.01)
*B65D 81/34* (2006.01)
*A47J 36/28* (2006.01)

(52) U.S. Cl.
CPC .......... *F24V 30/00* (2018.05); *B65D 81/3484* (2013.01); *A47J 36/28* (2013.01)

(58) Field of Classification Search
CPC F24V 30/00; A47J 36/28; A47J 36/30; B65D 81/3484
USPC ........................................ 126/236.01–236.1
See application file for complete search history.

(56) References Cited

U.S. PATENT DOCUMENTS

| | | | |
|---|---|---|---|
| 4,741,324 A * | 5/1988 | Ina | A47J 36/28 126/263.06 |
| 4,762,113 A | 8/1988 | Hamaski | |
| 4,793,323 A | 12/1988 | Guida et al. | |
| 5,035,230 A | 7/1991 | Steidl et al. | |
| 6,341,602 B1 | 1/2002 | Fulcher | |
| 6,539,935 B2 * | 4/2003 | Ichikawa | B65D 81/3484 126/263.09 |
| 10,478,015 B2 | 11/2019 | Sabin et al. | |
| 2006/0005827 A1 | 1/2006 | Consoli et al. | |
| 2007/0125362 A1 | 6/2007 | Ford et al. | |
| 2007/0164253 A1 * | 7/2007 | Iannicelli | C09K 5/18 252/186.25 |

(Continued)

OTHER PUBLICATIONS

International Search Report and Written Opinion for PCT/US20/57699 dated Jan. 27, 2021.

*Primary Examiner* — Vivek K Shirsat
(74) *Attorney, Agent, or Firm* — Sheehan Phinney Bass & Green PA (57) ABSTRACT

A sealed package is disclosed for a self-heating assembly that produces heat by virtue of a liquid reactant reacting exothermically with a solid reactant to heat a product. The sealed package includes an outer container, a lower support structure (e.g., of open cell foam) within the outer container, a layer of the solid reactant above the lower support structure and within the outer container, an upper structure (e.g., of open cell foam, as well) above the solid reactant and within the outer container, and an upper layer that is permeable to liquid and that extends across an otherwise open top of the outer container above the upper structure.

30 Claims, 5 Drawing Sheets

(56) References Cited

U.S. PATENT DOCUMENTS

2013/0213383 A1\* 8/2013 Young .............. B65D 81/3484
                                                    126/263.08
2016/0338530 A1   11/2016 Sabin et al.
2019/0059619 A1    2/2019 Hood et al.

\* cited by examiner

SEALED PACKAGE FOR SOLID REACTANT IN SELF-HEATING ASSEMBLY

CROSS-REFERENCE TO RELATED APPLICATION(S)

This application claims the benefit of priority to U.S. Provisional Patent Application No. 62/927,930, entitled SEALED PACKAGE FOR SOLID REACTANT IN SELF-HEATING ASSEMBLY, which was filed on Oct. 30, 2019. The disclosure of the prior application is incorporated by reference herein in its entirety.

FIELD OF THE INVENTION

This disclosure relates to a sealed package for a solid reactant in a self-heating assembly and, more particularly to a sealed package that facilitates manufacturability of a self-heating assembly of the type that heats a product with heat from an exothermic reaction between a liquid reactant and the solid reactant.

BACKGROUND

Some self-heating food packages, such as those produced by Tempra Technology, Inc. (the applicant of the current application) heat the food by causing a liquid reactant to react exothermically with a granular reactant. It is desirable to improve handling and manufacturing processes associated with such self-heating food packages, while providing safe, efficient and effective heating for the self-heating food package.

SUMMARY OF THE INVENTION

In one aspect, a sealed package is disclosed for a self-heating assembly that produces heat by virtue of a liquid reactant reacting exothermically with a solid reactant to heat a product. The sealed package includes an outer container, a lower support structure (e.g., of open cell foam) within the outer container, a layer of the solid reactant above the lower support structure and within the outer container, an upper structure (e.g., of open cell foam, as well) above the solid reactant and within the outer container, and an upper layer that is permeable to liquid and that extends across an otherwise open top of the outer container above the upper structure. In a typical implementation, additional solid reactant, in granular form, is distributed throughout the lower support structure; typically, with a substantial degree of uniformity.

In another aspect, a method is disclosed of manufacturing a self-heating container that includes a sealed package (that contains solid reactant to support an exothermic reaction). The method includes providing a heater tray, positioning the sealed package inside the heater tray, wherein the sealed package contains the solid reactant and has an upper layer that is permeable to liquid (e.g., the liquid reactant), positioning a frangible container that contains the liquid reactant inside the heater tray, and positioning a product tray within the heater tray to define a reaction space between the product tray and the heater tray, wherein the reaction space contains the sealed package and the frangible container. In a typical implementation, the sealed package includes an outer container, a lower support structure (e.g., of open cell foam) within the outer container, a layer of solid reactant (e.g., in the shape of a solid disk, which is in some implementations not only rigid, but friable and may have some degree of porosity as well) above the lower support structure and within the outer container, an upper structure (e.g., also open cell foam) above the solid reactant and within the outer container, and an upper layer (e.g., paper) that is permeable to liquid and that extends across an otherwise open top of the outer container above the upper structure.

In yet another aspect, a self-heating assembly includes a heater tray, and a sealed package inside the heater tray, a frangible container that contains a liquid reactant inside the heater tray and above the sealed package, a means for activating an exothermic reaction by rupturing the frangible container, and a product tray within the heater tray to define a reaction space between the product tray and the heater tray. The reaction space contains the sealed package and the frangible container. The sealed package contains a solid reactant and has an upper layer that is permeable to liquid. More specifically, the sealed package has an outer container, a lower support structure within the outer container, a layer of solid reactant above the lower support structure and within the outer container, an upper structure above the solid reactant and within the outer container, and the upper layer that is permeable to liquid and that extends across an otherwise open top of the outer container above the upper structure.

In still another aspect, a method is disclosed for manufacturing a sealed package for use in a self-heating assembly that produces heat by causing a liquid reactant to react exothermically with a solid reactant to heat a product. The method includes providing an outer container (e.g., of aluminum having a wall thickness of at least 0.005 inches), filling a bottom of the outer container with a lower support structure (e.g., of open cell foam), sprinkling a granular solid reactant (e.g., potassium permanganate granules coated with sodium silicate) into the open cellular network in the lower support structure, providing or forming a disk of non-granular solid reactant in the outer container and above the lower support structure, providing an additional structure (e.g., of open cell foam) above the disk of non-granular solid reactant, and sealing the open top of the outer container with paper by adhering or otherwise securing the paper to the outer container (e.g., to an outwardly-extended flange of the outer container).

In some implementations, one or more advantages are present.

For example, in large volume manufacturing of self-heating assemblies such as those described herein in detail, the sealed package and manufacturing techniques described herein that involve the sealed package, provide the convenience of having a component containing loose granules of solid reactant, for example, be handled as a unit (in a sealed package). In this regard, the sealed package described herein is packaged so as to be easily handled by a machine (or by hand) without leakage, even if it is not handled gently.

In various implementations, the sealed package described herein and the self-heating assemblies utilizing sealed packages provide for safety, reliability, ease of handling during assembly, and speed in manufacturing and use of the self-heating assembly. Also, the resulting self-heating assembly has very low heating times, which tends to be an important requirement in consumer food heaters, for example.

Other features and advantages will be apparent from the description and drawings, and from the claims.

BRIEF DESCRIPTION OF THE DRAWINGS

Like reference characters refer to like elements.

DETAILED DESCRIPTION

This application relates to self-heating assemblies of the type in which two reactants—one liquid and one solid—are brought into contact with one another to react in an exothermic manner and thereby heat a product, such as food or drink, contained therein. Moreover, this application relates to a sealed package (containing the solid reactant) that can be placed conveniently, while sealed, into the aforementioned self-heating assembly during manufacturing of the self-heating assembly. Such sealed packages facilitate handling the solid material, some of which may be in a granular form, especially during the manufacturing process, because the solid material remains contained within the sealed packages throughout shipping, handling, the manufacturing process, and beyond.

Figure 1:
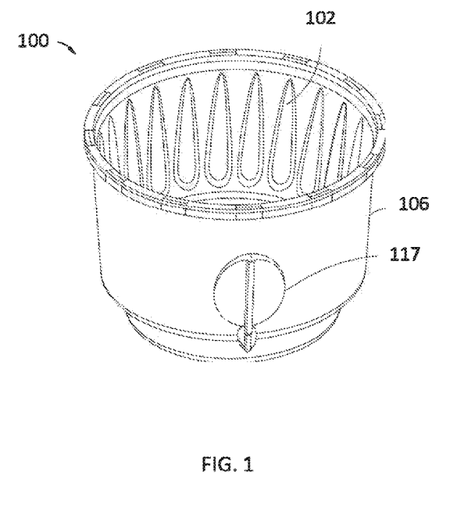
FIG. 1 is a perspective view an implementation of a self-heating assembly, without a cover.
Figure 2:
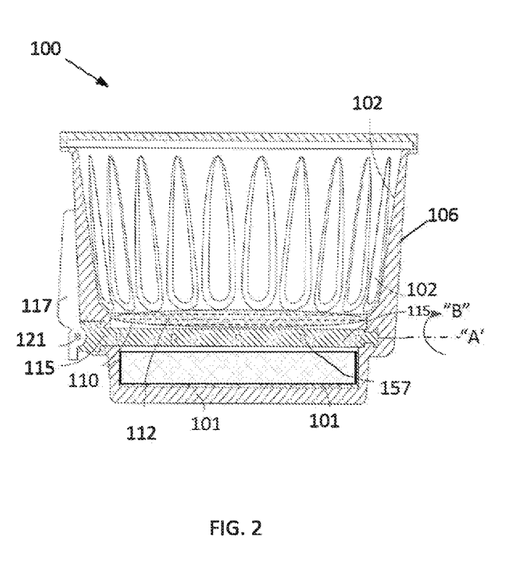
FIG. 2 is a cross-sectional side view of the self-heating assembly of FIG. 1.
Figure 3:
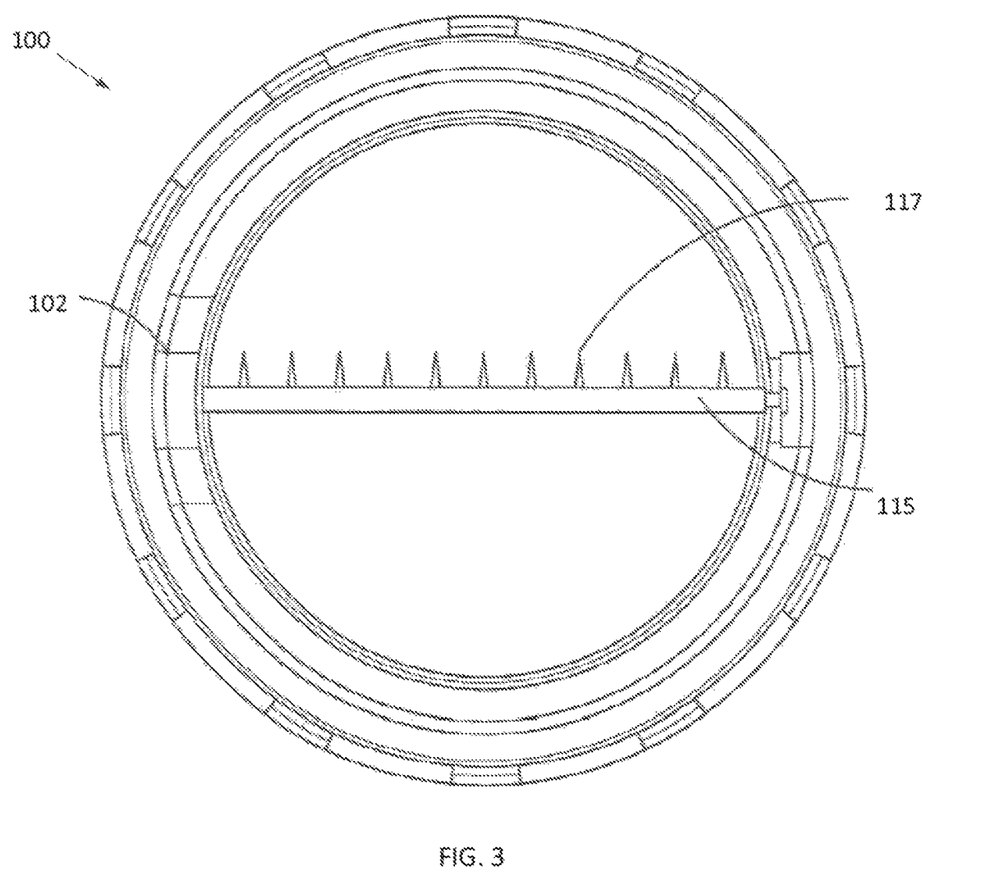
FIG. 3 is a cross-sectional top view of the self-heating assembly of FIG. 1.

FIGS. 1 to 3 show one exemplary implementation of a self-heating assembly 100 of the type in which two reactants—one liquid and one solid—are brought into contact with one another to react in an exothermic manner. The illustrated self-heating assembly 100 is similar in some ways to the self-heating assembly described in prior patent application Ser. No. 15/076,996, entitled, Self-Heating Assembly with Distributed Reactant, filed by the current patent applicant, Tempra Technology, Inc., which is incorporated by reference herein in its entirety. Unlike the prior self-heating assembly, however, the self-heating assembly 100 in FIGS. 1 to 3 of the present application has, in its base, a sealed package 101 that contains, among other things, the solid reactant that participates in the exothermic reaction of the self-heating assembly 100. In a typical implementation, the sealed package 101 remains intact, with the solid reactant contained therein, during shipping, handling, and manufacturing of the self-heating assembly 100, and beyond including, for example, when the exothermic reaction occurs.

The self-heating assembly 100 has two nested trays: a product tray 102 for holding a product (e.g., food, drink, etc.) to be heated and a heater tray 106 coupled to the product tray 102. The product tray 102 is nested inside the heater tray 106 and there is a reaction space 108 between them. In the illustrated implementation, the reaction space 108 extends from the base of the heater tray 106 to the base of the product tray 102 and from the sides of the heater tray 106 to the sides of the product tray 102. In a typical implementation, the product tray is filled with a product to be heated (e.g., food, drink, etc.) and then sealed (e.g., with a suitable cover, foil, etc.) secured to and/or adhered to the upper perimeter surface of the self-heating assembly 100.

Beneath the product tray, inside the reaction space 108 is a frangible container 110 made of plastic or the like that contains the liquid reactant 112 (e.g., fuel), as well as the sealed package 101 that contains the solid reactant. A cutting element 115 extends diametrically across a bottom portion of the reaction space 108 between the frangible container 110, which is above the cutting element 115 and the sealed package 101, which is below the cutting element 115. In the illustrated implementation, the cutting element 115 includes has an elongate shaft, with a plurality of cutting blades 157 that extend in a radially outward direction from the shaft generally parallel to one another. The cutting element 115 is supported at opposite ends thereof by support surfaces or bearings that allow the cutting element to rotate about the axis "A" of the elongate shaft in a direction indicated by arrow "B."

Before the exothermic reaction is initiated, the cutting blades 157 are configured so that they do not pose a risk of cutting into or rupturing the frangible container 110. An example of this configuration is shown in FIGS. 2 and 3, where the cutting blades 157 extend in a horizontally outward direction from the elongate shaft, between the frangible container 110 and the sealed package 101.

One end of the cutting element 115 has a knob 117 that is exposed at an outer surface of the self-heating assembly 100. When a user turns the knob 117, the cutting blades 157 rotate about axis "A," which causes the cutting blades 157 to cut into and rupture the frangible container 110 thereby releasing the liquid reactant from the frangible container 110. The upper layer of the sealed package above the solid reactant is permeable to liquid. Since the frangible container 110 is above the sealed package 101 and since the sealed package 101 has an upper layer that is permeable to liquid, the liquid reactant that is released from the frangible container 110 flows down and into the sealed package 101, through the liquid permeable upper layer, to contact the solid reactant to thereby initiate the exothermic reaction.

Heat generated by the exothermic reaction flows up through the reaction space 108 to and through the base of the product tray 102 and around and through the sides of the product tray 102 to heat the product contained therein. The reaction space 108 thus accommodates the exothermic reaction, the heat from which passes through the product trays 102 to heat the product contained therein. In a typical implementation, the user will allow some time to pass (e.g., a minute or so) and then peel back the cover of the self-heating container to access and consume (or otherwise use) the heated product inside the product tray 102. In some implementations, a few minutes of time may pass depending on the design of the heater and heat capacity and viscosity of the food inside or product to be heated.

In a typical implementation, and as shown in FIGS. 1 to 3, the sealed package 101 is sized so that it fills the bottom of the reaction space 108 completely, leaving virtually no empty space around its perimeter. This helps to ensure that all of the liquid reactant that flows out of the frangible container 110 ends up flowing into the sealed package 101 to react with the solid reactant contained therein.

Figure 4:
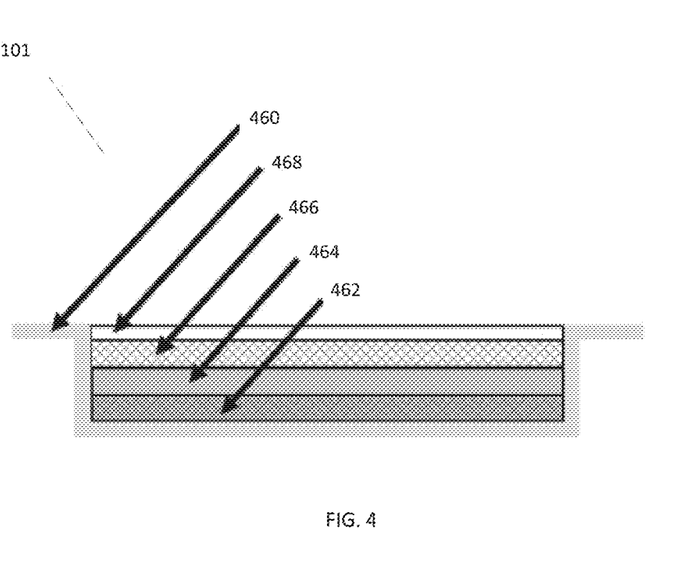
FIG. 4 is a schematic cross-sectional side view of an implementation of the sealed package inside the self-heating assembly of FIG. 1.

FIG. 4 shows a cross-sectional representation of an exemplary implementation of the sealed package 101 (containing solid reactant) of FIGS. 1 to 3.

The illustrated sealed package 101 has a tray-shaped outer container 460, a lower support structure 462 (e.g., a disk of open cell foam or the like) within the outer container 460, a layer of non-granular, solid reactant 464 (e.g., a disk of solid reactant) above the lower support structure 462 and within the outer container 460, an upper structure 466 (e.g., another disk of open cell foam or the like) above the solid reactant 464 and within the outer container 460, and an upper layer 468 (e.g., paper or the like) that is permeable to liquid (e.g., permeable to the liquid reactant) and that extends across an otherwise open top of the outer container 460 above the upper structure 466.

In the illustrated implementation, the outer container 460 forms a tray with a flat bottom, raised edges, and an outwardly-extended flange. The upper layer 468 extends across the opening at the top of the tray to seal the contents of the tray therein. More specifically, in the illustrated implementation, the outwardly-extended flange, in the illustrated implementation, provides a surface to which the upper layer 468 of the sealed package 101 is adhered or secured.

Any one of a variety of adhesive materials can be used to adhere the upper layer 468 of the sealed package 101 to the outwardly-extended flange of the outer container 460. In a typical implementation, the adhesive material is configured to remain tacky long enough for the cover sheet to be properly placed and pressed down. In various implementations, the adhesive materials are superglue, hot melt glue, two-part epoxy, Amazing Goop® adhesive, a household cement, which cures to a somewhat elastic bond, or any other one of a variety of suitable adhesives. Moreover, in a typical implementation, the adhesive materials are impervious to boiling water.

Moreover, the adhesive material typically is one that can stay intact, and holding the upper layer 468 in contact with the outwardly-extended flange, throughout the life cycle of the sealed package 101 and the self-heating container 100. So, in a typical implementation, the adhesive material should be one that can withstand (and keep adhering) when exposed to the liquid reactant and the temperatures associated with the exothermic reaction (e.g., water boiling, approximately 100 degrees C.).

Any one of a variety of other techniques may be used to secure the upper layer 469 of the sealed package 101 in place across the otherwise open top of the outer container 460. For example, in some implementations, the outer perimeter of the upper layer 469 may be crimped onto the outwardly-extended flange of the outer container 460.

The outer container 460 of the sealed package 101 can be made from any one of a variety of solid materials. Typically, the outer container 460 is impermeable to liquid and able to withstand the temperatures associated with the exothermic reaction in the self-heating assembly 100. Moreover, typically, the outer container 460 is made from a solid material that can be shaped into a desired configuration (such as the tray-like shape shown in FIG. 4) and resist deformation at least somewhat. An example of such material is aluminum. Another example of such a material is copper, which is more expensive than aluminum, but could be half as thick as the aluminum.

The material of the outer container 460 (e.g., of aluminum) has a thickness. This thickness can vary. However, it can be desirable, in some instances, for the aluminum outer container to have a wall thickness of at least 0.005 inches. This minimum thickness can help ensure that even under fairly extreme off-design conditions local heating will not damage the heater tray 106, which is typically plastic. The heat conductivity associated with aluminum having at least the minimum thickness helps prevent such damage from occurring. In some implementations, the aluminum tray may have a wall thickness between 3 and 4 millimeters.

The height of the outer container 460 (i.e., the distance between the base and the flange) can of course vary. In various implementations, the height of the outer container 460 may be between about ¼ inch and 1 inch.

The lower support structure 462 is at the bottom of the outer container 460. In a typical implementation, the lower support structure 462 is a disk-shaped and made of open cell foam, or another cellular or porous material, through which liquid (e.g., the liquid reactant) can flow or pass. The lower support structure 462 in the illustrated implementation is dimensioned to cover the entire inner bottom surface of the outer container 460. Moreover, in the illustrated implementation, the side edge of the lower support structure 462 is in contact with the inner side wall of the outer container 460 arounds its entire perimeter.

In certain implementations, some of the solid reactant—in granular form—may be spread out across lower support structure 462 and supported, for example, atop and/or within the open cells or pores of the lower support structure 462. In those implementations, the solid granular reactant may be spread out substantially evenly across the lower support structure 462.

The lower support structure 462 is generally configured to facilitate liquid flow (e.g., flow of the liquid reactant) through the lower support structure 462. This enables any of the liquid reactant that reaches, for example, the outer perimeter of the lower support structure 462 to flow through the lower support structure 462 and reach any of the granular solid reactant that might be spread out within and/or on the lower support structure 462, as well as the bottom surface of the layer of solid reactant 464 that is directly above the lower support structure 462. In a typical implementation, this helps ensure that the exothermic reaction happens quickly and increases the likelihood that more granular reactant will actually react.

In a typical implementation, the lower support structure 462 has sufficient structural integrity to physically support any components that sit atop the lower support structure 462 without undue compression, which might compromise the ability of the lower support structure to carry the liquid reactant to the granular solid reactant within or on the lower support structure 462 and the bottom surface of the layer of solid reactant 464 directly above the lower support structure. In the illustrated implementation, for example, the lower support structure 462 is strong enough to physically support any granular solid reactant on or within the lower support structure 462, the layer of non-granular solid reactant 464 above the lower support structure 462, and the upper structure 466 above the layer of non-granular solid reactant 464. Typically, the lower support structure 462 does this with no more than very minimal, if any, noticeable compression—e.g., less than about 10% of its thickness.

The lower support structure 462 in the illustrated implementation has a height (e.g., from its lower surface, which is in contact with the base of the outer container 460 to its upper surface, which is opposite and above its lower surface) that is about ⅓ the height of the outer container 460. This can vary considerably, of course, and the lower support structure 462 can have a height anywhere from about $\frac{1}{16}^{th}$ of an inch (or less) to ½ an inch (or more). In one exemplary implementation, a disk of approximately $\frac{1}{8}^{th}$ inch thick open-cell plastic foam may be placed in the bottom of the aluminum tray before pouring the granular material into the tray. This, of course, provides a fuel flow path for the underside of the clump-cast granules during operation of the self-heating container 100.

The size of the individual grains of granular solid reactant that may be spread across, and throughout, the lower support structure 462 can vary as well. Some of the granules may be sized so that they sit atop the open cell foam material of the lower support structure 462. Some of the granules may be sized to fit within the open cells or pores of the lower support structure 462. In some implementations, the size of the individual grains may vary, such that some of the grains sit atop of the lower support structure 462 and some of the granules are within the open cells or pores of the lower support structure 462.

In some implementations, the grains are very small compared to the cells or pores of the lower support structure 462, which may have a nominal pore count, for example, between about 25 and 45 pores per inch (e.g., 30 ppi), such that the grains fall into and at least some of them reach the bottom (or near the bottom) of the lower support structure 462 through the cells or pores. Having grains at or near the bottom of the lower support structure 462 can be desirable, because these grains will begin reacting as soon as the liquid reactant reaches them (e.g., by flowing down to the bottom of the chamber). The resulting reaction produces boiling, which helps wet the grains of reactant located higher up in the lower support structure 462 and also the bottom surface of the layer of non-granular solid reactant 464.

The layer of non-granular solid reactant 464, in the illustrated implementation, is above and in direct physical contact with the lower support structure 462. This layer of solid reactant 464 is in the form of a solid disk with a flat top surface, a flat bottom surface, and a cylindrical side surface. The layer of non-granular solid reactant 464 typically has a cake-like consistency and, therefore, tends to maintain the disk-shaped configuration under normal handling conditions. Additionally, in a typical implementation, the solid bonded granules are rigid and strong enough to handle, but easily broken, and readily friable. Moreover, in a typical implementation, the layer of non-granular solid reactant 464 typically maintains its disk-shaped configuration unless and until it is exposed to the liquid reactant, with which it reacts, exothermically. The reaction begins to compromise the disk-shaped configuration of the layer of non-granular solid reactant 464. As the reaction continues, the layer of non-granular solid reactant 464 progressively dissolves until very little or none of the solid reactant remains.

In some implementations, the solid reactant, whether in granular or non-granular form, is an oxidizing agent (e.g., potassium permanganate, which may be coated with sodium silicate) and the liquid reactant is a reduction agent (e.g., an aqueous ethylene glycol fuel). It is possible of course for other types of reactants to be used instead. In this regard, many oxidizing agents are capable of generating suitable energies upon reaction with a corresponding fuel. Typical oxidizing agents include those comprising the alkali metal salts of the oxides of manganese and chromium. These include such compounds as potassium permanganate, and potassium chromate. Other suitable oxidizing agents are pyridinium dichromate, ruthenium tetroxide and chromic acid, as well as a host of other oxidizing agents. Preferably, the oxidizing agent comprises alkali metal salts of permanganate. The corresponding fuels which may be suitable for use in the exothermic chemical reaction are generally organic compounds. Particularly well suited organic compounds are alcohols. Alcohols are easily oxidized to carbonyl-containing compounds by the oxidizing agents described above. The alcohols may be primary alcohols, and preferably polyols which contain at least two hydroxyl groups. Such polyols are also readily oxidized to aldehydes and carboxylic acids. This oxidation of polyols and the simultaneous reduction of the oxidizing agent are generally accompanied by the release of significant amounts of heat energy. One preferred fuel is glycerin.

In a typical implementation, the layer of non-granular solid reactant 464 is in contact with and/or presses down on an upper surface of the lower support structure 462 which helps maintain the typically substantially uniform distribution of granular solid reactant atop the lower support structure 462, at least until the layer of non-granular solid reactant 464 starts to dissolve.

There are a variety of ways in which the layer of non-granular solid reactant 464 may be formed. In one such exemplary method, the solid reactant (e.g., potassium permanganate coated with sodium silicate) may be supplied as a powder or in granular form into a cylindrical container and then exposed to humidity (e.g., in a humid environment or by using a humidifier, i.e., a collection of components that create humidity). In an exemplary implementation, the humidity causes the sodium silicate to absorb moisture from the humid environment and bind the powdered or granular solid reactant into a puck or disk-shaped configuration. Then, typically, the disk-shaped solid reactant is removed from the humidity and allowed to dry. In some implementations, drying may be accelerated by exposing the disk-shaped solid reactant to a heated environment (e.g., in an oven) for some period of time. The heated environment can be a relatively low temperature (e.g., 120° F.) and the period of time may be, for example, between 1 and 4 hours. However, it may be possible of course to use a higher temperature and a lesser amount of time to dry the humidified disk.

The upper structure 466 in the outer container 460 is disk-shaped and made of open cell foam, or another cellular or porous material, through which liquid (e.g., the liquid reactant) can flow or pass. In some implementations, the upper structure 466 is made from the same material as the lower support structure 462. However, that need not be the case. For example, in some implementations, the open cells or pores in the upper structure 466 may be larger than the open cells or pores in the lower support structure 462. In some implementations, the open cells or pores in the upper structure 466 may be smaller than the open cells or pores in the lower support structure 462.

The upper layer 468 in the illustrated implementation extends across and covers the open top of the outer container 460. More specifically, an outer perimeter of the bottom surface of the upper layer 468 is secured to the upper surface of the outwardly-extended flange portion of the outer container 460. In some implementations, the upper layer may be secured using a hot melt adhesive, or any other type of adhesive or securing technique that can maintain the upper layer 468 in contact with and sealed against the outer container 460 throughout the usable life of the self-heating assembly 100. When the upper layer 468 is so adhered against the outwardly-extended flange portion of the outer container 460, the upper layer 468 and the outer container 460 collectively seal the inner compartment of self-heating assembly 100 thereby preventing the escape of any loose powder, or the like, from the self-heating assembly 100.

In a typical implementation, the upper layer 468 is paper. However, in various implementations, the upper layer 468 can be another material. The other material should be permeable to liquid, and able to withstand operating conditions associated with self-heating assembly 100.

The sealed packages 101 can be assembled in a variety of ways.

One implementation of the assembly process includes providing the components thereof including the outer container or material (such as aluminum) to shape into the outer container, one or more pieces of open cell foam or another cellular or porous material to form or serve as the lower support structure and the upper structure, solid reactant (typically provided in granular form), paper (or some other liquid permeable and application-suitable material) to form the upper layer, and an adhesive material.

If a sheet of aluminum or other material is provided not in the shape of a tray, then that sheet of aluminum or other material is shaped to form a tray—typically one that has an upper, outwardly-extended flange, as shown in FIG. 1.

Next, if needed, the open cell foam or other cellular or porous material is cut to fit snugly into the bottom of the outer container to serve as the lower support structure. The lower support structure is then positioned in the bottom of the outer container.

Next, the granular reactant is poured into the outer container atop the lower support structure, typically filling in, at least some portion of the open cells of lower support structure.

Next, the non-granular disk of solid reactant is formed. This non-granular disk of solid reactant may be formed in a variety of different ways. For example, the non-granular disk of solid reactant may be formed outside of the outer container and dropped into the outer container atop the granular material that has been poured on top of and into the lower support structure. Alternatively, the non-granular disk of solid reactant may be formed inside the outer container on top of the granular material that has been poured on top of and into the lower support structure.

There are a variety of ways that the non-granular disk of solid reactant may be formed outside of the outer container. For example, the solid reactant (e.g., potassium permanganate coated with sodium silicate) may be supplied as a powder or in granular form into a cylindrical container and placed on a stand above water inside the container. This exposes the granular material to humidity. The humidity causes the sodium silicate to absorb moisture from the humid environment and bind the powdered or granular solid reactant into the puck or disk-shaped configuration. Then, the disk-shaped solid reactant is removed from the humidity and allowed to dry. In some implementations, drying may be accelerated by exposing the disk-shaped solid reactant to a heated environment (e.g., in an oven) for some period of time. If this method of forming the non-granular disk of solid reactant is utilized, then the disk, indeed multiple disks, can be prepared in advance of assembling the sealed package(s).

There are a variety of ways that the non-granular disk of solid reactant may be formed inside the outer container on top of the granular material that has been poured on top of and into the lower support structure. For example, additional granular material may be poured into outer container atop whatever granular material may have already been poured into the lower support structure. In a typical implementation, this additional granular material may be sufficient to form a layer that has a thickness that is the same, or at least substantially similar to, the thickness of the lower support structure. Next, the outer container, which contains the lower support structure and the granular material inside of it, is placed into a humid environment. This exposes the granular material to humidity. The humidity causes the sodium silicate to absorb moisture from the humid environment and bind the powdered or granular solid reactant into the puck or disk-shaped configuration. The binding also may cause the solid reactant to bind to the lower support structure and to the inner side walls of the outer container. Then, the outer container is removed from the humidity so that the granular material inside of it can dry. In some implementations, drying may be accelerated by exposing the outer container to a heated environment (e.g., in an oven) for some period of time.

The bonding helps ensure that the non-granular disk cannot shift around or move to one side of the reaction chamber, in a pile, for example, when the container is turned on its side in shipping or storage. In a typical implementation, the foam helps prevent the powder from shifting.

Next, if needed, the open cell foam or other cellular or porous material is cut to fit snugly into the outer container above the disk of solid reactant to serve as the upper structure. The upper structure is then positioned inside the outer container above the disk of non-granular solid reactant.

Next, if necessary, the paper (or other liquid permeable and application-suitable material) is cut to extend over the open top of the outer container. The material is then attached to the outer container, typically by the use of a hot melt adhesive to adhere the outer perimeter of the lower surface of the paper to the outwardly-extended flange of the outer container. In a typical implementation, the hot melt adhesive is applied to the entire perimeter of the paper/flange interface without breaks. The material thereby serves as the upper layer of the outer container and seals the aforementioned solid reactant and foam inside the sealed package.

Having preassembled sealed packages 101 (i.e., sealed packages 101 that have been assembled, as mentioned above for example, prior to manufacturing the self-heating assembly 100) facilitates manufacturability of the self-heating assembly 100. In this regard, the sealed package 101 (or multiple sealed packages 101) can be manufactured, and, when a self-heating assembly 100 is being manufactured, one of the sealed packages 101 can be simply dropped into the base of the self-heating assembly 100 at an appropriate point in the manufacturing process. This simplifies handling of the solid reactant, particularly the granular solid reactant, during the self-heating assembly 100 manufacturing process. For example, without the preassembled sealed packages 101, there is a significant risk that the granular reactant may be spilled or dust up, create a mess, and/or end up in parts of the self-heating container where it is not desired. However, with the preassembled sealed packages, containing and controlling the granular reactant is simplified and improved considerably.

To activate the heating functionality in the self-heating assembly, a user would manipulate the handle 117 to cause the shaft 115 to rotate about axis "A" in the direction indicated by arrow "B." This would cause the cutting blades 157 to move into, and eventually cut or rupture the frangible container 112. In the illustrated example, to manipulate the handle in this way, the user might first lower the handle 117 to an activating position (e.g., by swinging the handle about hinge 121) and then rotating the handle about the axis "A" in the direction indicated by arrow "B."

When the liquid fuel is released from the frangible container 112, the liquid fuel flows in a downward direction toward the bottom of the self-heating assembly 100. Since the sealed package 101 is at the bottom of the self-heating container 100 and fills (or at least substantially fills) the bottom of the self-heating container 100, most, if not all, of the liquid fuel released from the ruptured frangible container 112 passes through the upper layer 468 of the sealed package 101 and into sealed package 101.

The liquid fuel that flows into the sealed package 101 flows through the open cellular structure of the upper structural element 466 inside the sealed package 101. Passing through the open cellular structure of the upper structural element 466 tends to distribute the liquid fuel across the upper surface of the disk of non-granular solid reactant 464. Wherever the liquid fuel contacts the disk of non-granular solid reactant 464, it reacts with the non-granular solid reactant exothermically.

Some of the liquid fuel that flows into the sealed package 101 also finds its way down to the bottom of the sealed package 101, where it comes into contact with the granular solid reactant that is distributed throughout the open cellular network of the lower support structure 462. Wherever the liquid fuel contacts the granular solid reactant, it reacts with the granular solid reactant exothermically.

In a typical implementation, heat from the exothermic reaction(s) causes liquid, especially at the bottom of the sealed package 101, to boil. The boiling creates turbulence which tends to urge the liquid fuel from the bottom of the sealed package 101 to move incrementally up through the open cellular structure of the lower support structure 462 to contact more and more of the granular solid reactant embedded in the lower support structure 462. Eventually, the level of liquid (and the boiling of that liquid) increases in the bottom of the sealed package 101 to the point where the liquid fuel is able to reach the bottom of the non-granular disk of solid reactant 464. This causes an exothermic reaction to occur at the surface bottom of the non-granular disk of solid reactant. At this point, in a typical implementation, heat is being produced by exothermic reactions occurring above and below the non-granular disk of solid reactant 464. This produces a large amount of heat very quickly to heat any product (e.g., food, drink, etc.) in the product tray 102.

Figure 5:
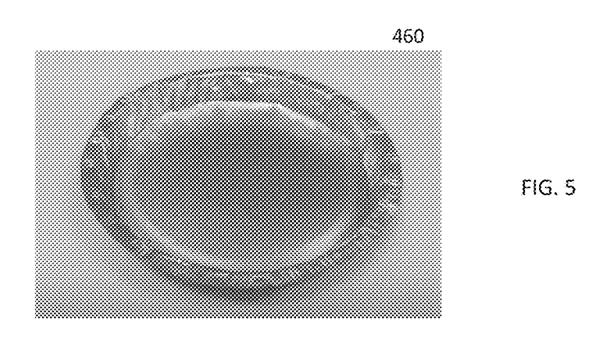
FIG. 5 is a top perspective view of an implementation of the outer container from FIG. 4 for the sealed package.

FIG. 5 is a perspective view of an exemplary implementation of the outer container 460 portion of the sealed package 101. The illustrated outer container 460 has a flat base, a side wall that extends upward (and that may be slightly flared outward) from the base, and a flange that extends in an outward direction from the upper end of the side wall. The illustrated outer container is made of aluminum.

Figure 6:
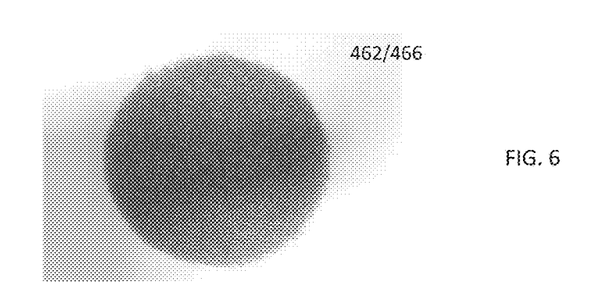
FIG. 6 is a top view of an implementation of an upper or lower support structure of open cell foam for the sealed package of FIG. 4.

FIG. 6 is a top view of an exemplary implementation of an upper or lower support structure (466 or 462) for the sealed package 101. The illustrated structure is open cell foam and has an overall shape that is disk-shaped.

Figure 7:
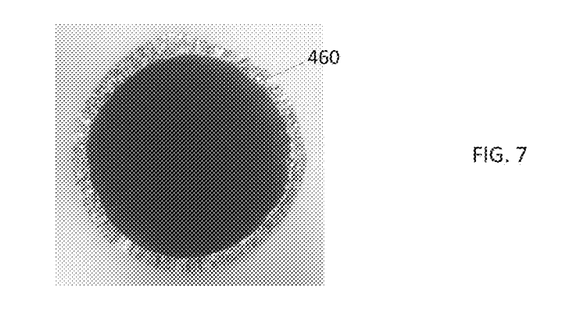
FIG. 7 is a top view of an implementation of the sealed package of FIG. 4.

FIG. 7 is a top view of the outer container from FIG. 4 with the disk-shaped foam and an exemplary disk of solid reactant (464) therein.

Figure 8:
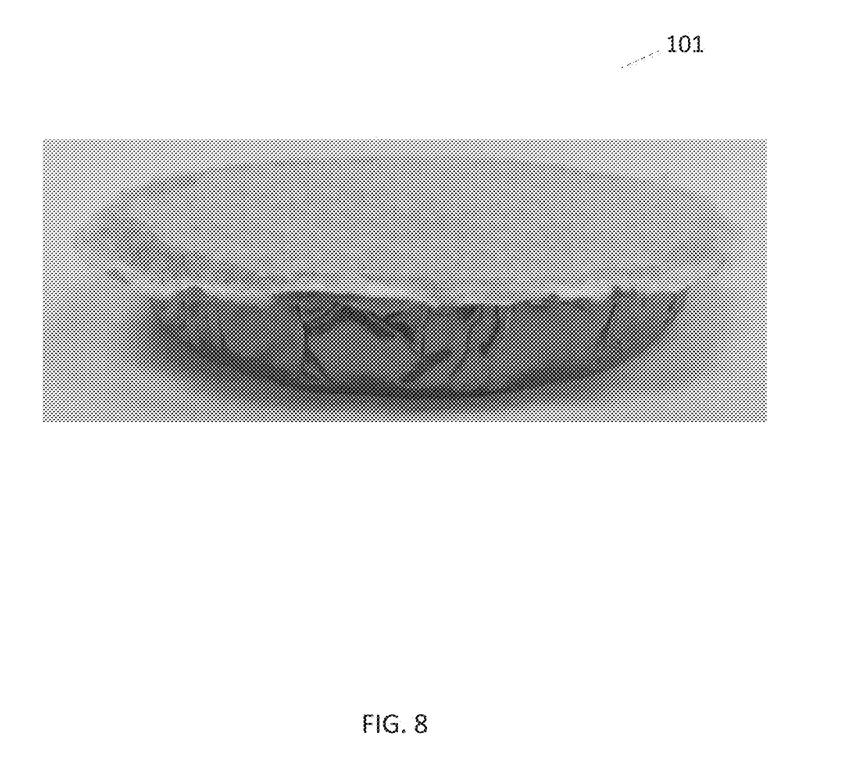
FIG. 8 is a perspective view of an implementation of the sealed package of FIG. 4.

FIG. 8 is a perspective side view of an exemplary sealed package 101. The sealed package 101 has the exemplary outer container 460 of FIG. 4 and a sheet of paper extended over the open top of the outer container 460 and serving as an exemplary upper layer 468 of the sealed package 101.

A number of embodiments of the invention have been described. Nevertheless, it will be understood that various modifications may be made without departing from the spirit and scope of the invention.

The self-heating assembly described herein is only one example of a self-heating container in which the sealed package can be used.

For example, in the implementation shown in FIGS. 1-3, the frangible container is directly beneath the base of the product tray, the cutting element is directly beneath the frangible container and the sealed package (containing the solid reactant) is directly beneath the cutting element. Other relative arrangements are possible. For example, in some implementations, the cutting element could be above or on a side of the frangible container. Also, the cutting element could take a form other than the shaft with cutting blades represented in FIGS. 1-3. For example, the cutting element could include one or more spikes that are moved in n axial manner to puncture the frangible membrane.

The size and relative configurations of the inner product tray and the outer heater tray can vary considerably. Thus, the size and shape of the chamber between the inner product tray and the outer heater tray can vary as well. The size and shape/configuration of the sealed package can vary considerably. Other aspects of the sealed package can vary as well.

The sealed package can have any one of a variety of different shapes. In some implementations, for example, the shape may be that of a bowl or plate. In other implementations, the sealed package may be an oval or any other shape.

In some implementations, all of the solid reactant can be in granular form, with none of the solid reactant in the disk-shaped non-granular configuration described herein. In some of those instances, the granular solid reactant may be sufficient in amount to fill approximately $\frac{1}{3}^{rd}$ of the sealed package.

The lower support structure and/or the upper structure can take any one of a variety of different forms. For example, in various implementations, any one or both may be an open cell foam, a non-woven material such as felt, a filter pad, a quilted tea bag material, deep flocking, a water-permeable honeycomb, deep-pile carpet, short lengths of tubing packed tightly together, a layered mass of tissue paper (e.g., with granules packed between layers), etc. In some implementations, including the one shown in FIGS. 1-3, both layers are open cell foam.

In a typical implementation, some of the granules are held in place by the lower support structure itself. For example, in the case of open cell foam, some of the granules may be positioned or wedged inside the open cells of the foam and held in place by virtue of being so wedged. Additionally, in a typical implementation, prior to heater activation, the lower support structure is in close physical contact with its surrounding components (e.g., the side walls of the heater tray, the bottom surface of the heater tray, etc.). This sort of arrangement can help prevent any loose granules (e.g., ones that are not tightly held in place by the support structure itself) from migrating around within the self-heating assembly (e.g., above, below or on the sides of the support structure).

The means for activating the reaction by rupturing the frangible container is described as an external knob connected to an internal shaft with cutting blades that extend in a radially outward direction from the shaft generally parallel to one another. The activation means, however, can take any one of a variety of different forms. For example, in various implementations, the activation means may be a sliding element with a cutting blade that moves into the frangible container when slid, or a push button that can be pressed to urge a spike or other cutting blade into the frangible container, or a pair of surfaces that can be pushed toward one another to squeeze the frangible container until it ruptures, or something else. Even the activation means shown in FIGS. 2 and 3, for example, can vary—with more or less cutting blades, with the cutting blades being longer or shorter or having a different shape, with a different kind of external knob, etc.

In an exemplary implementation, the first liquid reactant is or contains a fuel (e.g., a polyol fuel, such as ethylene glycol or glycerol) and the second granular reactant is or contains an oxidizing agent (e.g., alkali metal permanganate, for example, potassium permanganate). In some exemplary implementations, the first liquid reactant is or contains water and the second granular reactant is or contains calcium oxide. Any set of reactants may be used, as long as one is a liquid or slurry that can flow through the upper layer of the sealed package and through the upper structure and lower support structure to access the other reactant, a granular and/or solid disk reactant in the sealed package. In one specific implementation, the reactants are potassium permanganate and a water solution of glycerin.

In a typical implementation, the grains of solid reactant will have been over coated with graded thicknesses of sodium silicate (water glass). Since sodium silicate is slowly soluble in hot water, and water may be a major component of the liquid, varying the thicknesses of sodium silicate allow adjustments in the time at which the potassium permanganate granules react with the polyol fuel. In some implementations, however, no sodium silicate is included.

The relative and absolute sizes of the various sub-components can vary considerably. A variety of materials may be suitable to form each sub-component.

The support structure(s) can be virtually any kind of structures that are able to perform the functionalities described herein and attributed to the support structure(s).

In various implementations, various types of tamper-evidence protection can be provided. Generally speaking, tamper-evidence protection provides an indicator or barrier to entry which, if breached or missing, can reasonably be expected to provide visible evidence to consumers that tampering has occurred. Examples of tamper-evidence protection can include, for example, break-away tabs, plastic wrap around external portions of the knob assembly, etc.

Various methods may be used to manufacture the layer of no-granular solid reactant. In one exemplary method, after placing an open top outer container (with the lower support structure and the granular reactant inside) in a water-vapor saturated atmosphere for about 12 hours the granules are formed into a rigid cake. They are then oven dried. A second disk of open-cell foam is then placed on top of the granular clump to provide a fuel flow path on the top, and a lightweight unglazed paper disk is cemented over the top to complete the package. The deliberate use of a fuel flow path on top of the granule cake helps prevent both the paper and the plastic fuel bag from sealing all or a portion of the granule bed during the initial fuel injection.

It should be understood that any relative terminology used herein, such as "upper", "lower", "above", "below", "front", "rear", etc. is solely intended to clearly describe the particular implementations being discussed and is not intended to limit the scope of what is described here to require particular positions and/or orientations. Accordingly, such relative terminology should not be construed to limit the scope of the present application. Additionally, the term substantially, and similar words, such as substantial, are used herein. Unless otherwise indicated, substantially, and similar words, should be construed broadly to mean completely and almost completely (e.g., for a measurable quantity this might mean, for example, 99% or more, 95% or more, 90% or more, or 85% or more).

In some implementations, the granular reactant is distributed or dispersed, with substantial uniformity, throughout the lower support structure. This means that the density of grains in multiple equal volumes of support structure (e.g., cubic centimeters) does not vary more than some particular amount (e.g., 10%, 15%, 20%, etc.). Moreover, in a typical implementation, the lower support structure supports and substantially maintains the distribution of the granular reactant throughout the lower support structure before and during the exothermic chemical reaction. In some implementations, this may mean preventing shifting of grains (of the granular reactant) so as to maintain the substantial uniformity of distribution.

The self-heating assembly can be used to heat any one of a variety of different products including food products, drinks, or non-edible goods.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations and/or processes are disclosed herein as occurring in a particular order, this should not be understood as requiring that such operations be performed in the particular order shown or in sequential order, or that all indicated operations be performed in order to achieve desirable results. In certain circumstances, multitasking or parallel processing may be advantageous.

Other implementations are within the scope of the claims.

What is claimed is:

1. A sealed package for a self-heating assembly, the sealed package comprising:
   an outer container;
   a lower support structure within the outer container;
   a layer of solid reactant above the lower support structure and within the outer container;
   an upper structure above the solid reactant and within the outer container; and
   an upper layer that is permeable to liquid and that extends across an otherwise open top of the outer container above the upper structure,
   wherein the lower support structure comprises a material selected from the group consisting of open cell foam, felt, a filter pad, a quilted tea bag material, deep flocking, a water-permeable honeycomb, deep-pile carpet, short lengths of tubing packed tightly together, and a layered mass of tissue paper.

2. The sealed package of claim 1, wherein the layer of solid reactant above the lower support structure is a layer of non-granular solid reactant.

3. The sealed package of claim 1, wherein the sealed package further comprises a granular solid reactant distributed throughout the material selected from the group consisting of open cell foam, felt, a filter pad, a quilted tea bag material, deep flocking, a water-permeable honeycomb, deep-pile carpet, short lengths of tubing packed tightly together, and a layered mass of tissue paper.

4. The sealed package of claim 3, wherein the upper structure comprises a material selected from the group consisting of open cell foam, felt, a filter pad, a quilted tea bag material, deep flocking, a water-permeable honeycomb, deep-pile carpet, short lengths of tubing packed tightly together, and a layered mass of tissue paper.

5. The sealed package of claim 1, wherein the outer container is aluminum and has a minimum wall thickness of 0.005 inches.

6. The sealed package of claim 1, wherein the solid reactant is an alkali metal salt of an oxide of manganese or chromium.

7. The sealed package of claim 1, wherein the solid reactant is selected from the group consisting of potassium permanganate, potassium chromate, pyridinium dichromate, ruthenium tetroxide and chromic acid.

8. The sealed package of claim 1, wherein individual granules of the solid reactant are coated with sodium silicate.

9. A method of manufacturing a self-heating container, the method comprising:
 providing a heater tray;
 positioning a sealed package inside the heater tray, wherein the sealed package contains a solid reactant and has an upper layer that is permeable to liquid;
 positioning a frangible container that contains a liquid reactant inside the heater tray; and
 positioning a product tray within the heater tray to define a reaction space between the product tray and the heater tray, wherein the reaction space contains the sealed package and the frangible container.

10. The method of claim 9, wherein the sealed package comprises:
 an outer container;
 a lower support structure within the outer container;
 a layer of the solid reactant above the lower support structure and within the outer container;
 an upper structure above the solid reactant and within the outer container; and
 the upper layer that is permeable to liquid and that extends across an otherwise open top of the outer container above the upper structure.

11. The method of claim 10, wherein the layer of solid reactant above the lower support structure is a layer of non-granular solid reactant.

12. The method of claim 10, wherein the lower support structure comprises a material selected from the group consisting of open cell foam, a non-woven material, a filter pad, a quilted tea bag material, deep flocking, a water-permeable honeycomb, deep-pile carpet, short lengths of tubing packed tightly together, and a layered mass of tissue paper.

13. The method of claim 12, wherein the sealed package further comprises a granular solid reactant distributed throughout the lower support structure.

14. The method of claim 13, wherein the upper structure comprises a material selected from the group consisting of open cell foam, a non-woven material, a filter pad, a quilted tea bag material, deep flocking, a water-permeable honeycomb, deep-pile carpet, short lengths of tubing packed tightly together, and a layered mass of tissue paper.

15. The method of claim 10, wherein the outer container is aluminum and has a minimum wall thickness of 0.005 inches.

16. The method of claim 10, wherein the solid reactant is an alkali metal salt of an oxide of manganese or chromium, and
 wherein the liquid reactant is an organic compound.

17. The method of claim 10, wherein the solid reactant is selected from the group consisting of potassium permanganate, potassium chromate, pyridinium dichromate, ruthenium tetroxide and chromic acid, and
 wherein the liquid reactant is an alcohol.

18. The method of claim 10, wherein individual granules of the solid reactant are coated with sodium silicate.

19. The method of claim 10, further comprising:
 providing a means for activating the reaction by rupturing the frangible container in the self-heating container.

20. The method of claim 10, further comprising:
 providing a product to be heated in the product tray; and
 sealing the product tray.

21. A self-heating assembly comprising:
 a heater tray;
 a sealed package inside the heater tray, wherein the sealed package contains a solid reactant and has an upper layer that is permeable to liquid;
 a frangible container that contains a liquid reactant inside the heater tray and above the sealed package;
 a means for activating an exothermic reaction by rupturing the frangible container; and
 a product tray within the heater tray to define a reaction space between the product tray and the heater tray, wherein the reaction space contains the sealed package and the frangible container,
 wherein the sealed package comprises:
 an outer container;
 a lower support structure within the outer container;
 a layer of the solid reactant above the lower support structure and within the outer container;
 an upper structure above the solid reactant and within the outer container; and
 the upper layer that is permeable to liquid and that extends across an otherwise open top of the outer container above the upper structure.

22. The self-heating assembly of claim 21, wherein the layer of solid reactant above the lower support structure is a layer of non-granular solid reactant.

23. The self-heating assembly of claim 21, wherein each of the lower support structure and the upper structure comprises a material selected from the group consisting of open cell foam, a non-woven material, a filter pad, a quilted tea bag material, deep flocking, a water-permeable honeycomb, deep-pile carpet, short lengths of tubing packed tightly together, and a layered mass of tissue paper.

24. The self-heating assembly of claim 21, wherein the sealed package further comprises a granular solid reactant distributed throughout the lower support structure.

25. The self-heating assembly of claim 21, wherein the outer container is in direct physical contact with an inner surface of the heater tray, which is plastic, and
 wherein the outer container is aluminum and has a minimum wall thickness of 0.005 inches.

26. A method of manufacturing a sealed package for use in a self-heating assembly that produces heat by causing a liquid reactant to react exothermically with a solid reactant to heat a product, the method comprising:
 providing an outer container;
 placing a lower support structure in against a bottom surface of the outer container, wherein the lower support structure has an open cellular structure;
 distributing a granular solid reactant into the open cellular structure of the lower support structure;
 providing or forming a disk of non-granular solid reactant in the outer container above the lower support structure;
 providing an additional structure above the disk of non-granular solid reactant, wherein the additional structure has an open cellular structure; and sealing an open top of the outer container with paper by adhering or otherwise securing the paper to the outer container.

27. The sealed package of claim 1, wherein the lower support structure is in direct physical contact with the outer container, wherein the layer of solid reactant is in direct physical contact with the lower support structure, wherein the upper structure is in direct physical contact with the layer of solid reactant, and wherein the upper layer is in direct physical contact with the outer container.

28. The sealed package of claim 1, wherein each of the lower support structure, the layer of solid reactant, the upper structure, and the upper layer is in direct physical contact with the outer container.

29. The sealed package of claim 1, wherein a side edge of the lower support structure is in contact with an inner side wall of the outer container arounds an entirety of a perimeter of the lower support structure.

30. The sealed package of claim 1, wherein the layer of solid reactant is non-granular and is in direct physical contact with the lower support structure.

\* \* \* \* \*